United States Patent [19]
Brunner et al.

[11] Patent Number: 5,645,335
[45] Date of Patent: Jul. 8, 1997

[54] DEVICE FOR CONVERTING THE PICTURES DISPLAYED ON A LUMINOUS SURFACE INTO ELECTRICAL SIGNALS

[75] Inventors: Alex Brunner, Milford, Mich.; Ferdinand Porsche, Stuttgart, Germany

[73] Assignee: Werner Tabarelli, Austria

[21] Appl. No.: 160,899

[22] Filed: Dec. 2, 1993

[30] Foreign Application Priority Data

Dec. 3, 1992 [AT] Austria .................. A2386/92

[51] Int. Cl.$^6$ .................................................. G03B 21/00
[52] U.S. Cl. ...................... 353/122; 355/44; 353/27 R
[58] Field of Search .................... 353/26 R, 26 A, 353/27 R, 27 A, 25; 348/110, 96, 111, 112; 358/505, 506, 507, 534; 355/45, 44

[56] References Cited

U.S. PATENT DOCUMENTS

| | | |
|---|---|---|
| 3,819,908 | 6/1974 | Abe . |
| 3,928,719 | 12/1975 | Sasabe et al. .................. 348/110 |
| 3,941,466 | 3/1976 | Shah .................. 353/27 R |
| 4,308,553 | 12/1981 | Roetling .................. 358/507 |
| 4,349,836 | 9/1982 | Sawano .................. 348/112 |
| 4,465,349 | 8/1984 | Rinn et al. .................. 353/25 |
| 4,700,237 | 10/1987 | Yoshioka et al. .................. 348/112 |
| 4,707,747 | 11/1987 | Rockwell, III . |
| 4,811,110 | 3/1989 | Ohmura et al. .................. 353/24 |
| 5,061,955 | 10/1991 | Watanabe .................. 355/45 |
| 5,271,066 | 12/1993 | Leonard .................. 353/27 R |
| 5,278,609 | 1/1994 | Sakaida .................. 355/43 |
| 5,416,605 | 5/1995 | Hideshima et al. .................. 355/45 |

FOREIGN PATENT DOCUMENTS

| | | |
|---|---|---|
| 0029390 | 5/1981 | European Pat. Off. . |
| 0041436 | 12/1981 | European Pat. Off. . |
| 0057748 | 8/1982 | European Pat. Off. . |
| 0108623 | 5/1984 | European Pat. Off. . |
| 0161601 | 11/1985 | European Pat. Off. . |
| 216304 | 4/1987 | European Pat. Off. . |
| 0231646 | 12/1987 | European Pat. Off. . |
| 252709 | 1/1988 | European Pat. Off. . |
| 344499 | 12/1989 | European Pat. Off. . |
| 0358796 | 3/1990 | European Pat. Off. . |
| 0426542 | 5/1991 | European Pat. Off. . |
| 2281581 | 3/1977 | France . |
| 2540262 | 8/1984 | France . |
| 2632471 | 12/1989 | France . |
| 8315103 | 9/1983 | Germany . |
| 3318040 | 8/1984 | Germany . |
| 3438938 | 5/1985 | Germany . |
| 3634848 | 4/1987 | Germany . |
| 3723785 | 1/1989 | Germany . |
| 0214833 | 8/1989 | Japan .................. 353/25 |
| 4246636 | 9/1992 | Japan .................. 353/25 |
| 1404599 | 9/1975 | United Kingdom . |
| 2178263 | 2/1987 | United Kingdom . |

OTHER PUBLICATIONS

Patent Absracts of Japan, vol. 4, No. 188 (P-042), Dec. 24, 1980 & JP-A-55 130531 (Canon Inc) 10.9/80.
Patent Abstracts of Japan, vol. 10 No. 358 (P-522), Dec. 2, 1986 & JP-A-61 1560365 (Canon Inc) Jul. 15, 1986.
P.C.T. Publication No. WO 83/03693* (PCT/EO83/00105), Oct. 27, 1983.
Patent Abstracts of Japan, vol. 15, Mar. 19, 1991, Excerpt re: JP-3-5744 Jan. 1, 1991.

*Primary Examiner*—William Dowling
*Attorney, Agent, or Firm*—Lorusso & Loud

[57] ABSTRACT

A device for converting the picture displayed on a screen (3) of a microfilm- or microfiche-reading device (1) into electric signals. In order to permit complete electronic reading of the screen, a bar (4) is provided which has a plurality of juxtaposed picture sensors (5) and which is movably guided by a guide element (6). For the purpose of fitting out the device subsequently, the device also has means for securing the guide element (6) in a specific position in relation to the screen (3).

20 Claims, 3 Drawing Sheets

0
DEVICE FOR CONVERTING THE PICTURES DISPLAYED ON A LUMINOUS SURFACE INTO ELECTRICAL SIGNALS

FIELD OF INVENTION

The invention relates to a device for converting the picture displayed on a luminous surface, in particular on a screen of a microfilm- or microfiche reading device, into electric signals.

BACKGROUND OF THE INVENTION

With microfilm- or microfiche reading devices in is often desirable to be able to print out the picture displayed on the screen or to be able to process it further in other data processing installations. Therefore, large microfilm-reading devices already exist which have an optoelectronic reading device with CCD-elements built into the actual piece of equipment behind the screen for the purpose of converting the optical picture data into electric signals which can then be further processed or printed out. With these large microfilm-reading devices, a tiltable mirror can be used, for example, to selectively direct the displayed data on the screen for the user, and to selectively direct it to the optoelectronic reading device. The drawback with these large microfilm-reading devices is that in addition to requiring a large amount of space they are very expensive. In addition, the picture is not visible on the screen during the optoelectronic reading operation.

Hand-held scanners are also known for electronically reading sectors of a screen of a microfilm-reading device. These hand-held scanners have a small moving optoelectronic picture sensor and only allow a small picture sector to be read, mostly a word or a line, but not a complete side of the screen.

The aim of the invention is to create a device which can be fitted subsequently to practically any screen, in particular a conventional and already existing microfilm- or microfiche-reading device, and which permits complete conversion into electric signals of the picture visible on the screen.

SUMMARY OF THE INVENTION

According to the invention this is solved in that the device has a bar with a plurality of picture sensors, preferably in substantially juxtaposed relationship, the bar being movably guided by at least one guide element, and that the device also has means for securing the, at least one, guide element in a specific position relative to the luminous surface.

Contrary to previously known large microfilm-reading devices, where the optoelectronic sensor units were integrated in the device itself behind the screen, the device according to the invention is able to be secured easily to the front of an existing screen and thus all the picture data is converted into electric signals.

BRIEF DESCRIPTION OF THE DRAWING

Advantages and details of the invention will be mentioned in greater detail in the following description of the drawings.

DESCRIPTION OF THE PREFERRED EMBODIMENT

Figure 1:
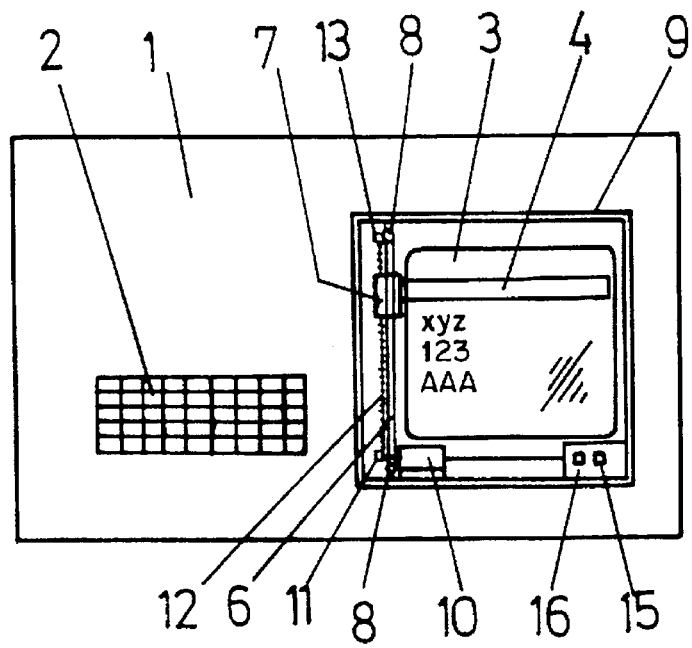
FIG. 1 is a front view of an illustration of a microfilm-reading device to which a device according to the invention is fixed for converting the picture displayed on the screen.

The microfilm-reading device 1 shown in FIG. 1 is of the conventional design and has, for example, operating elements 2 and a screen (viewing screen) 3 on which a picture (graph or text) is displayed. Particularly with smaller microfilm- or microfiche-reading devices, it used to be necessary for the person viewing the picture to write down relevant information by hand. Some devices were previously able to print out the picture, but the rest of the operations were done in electronic data processing installations. The device according to the invention now makes it possible for these devices to be fitted subsequently, and it is possible to convert the picture displayed on the screen into electric signals which can then be further processed in any data processing installation and obviously also be printed out.

Figure 4:
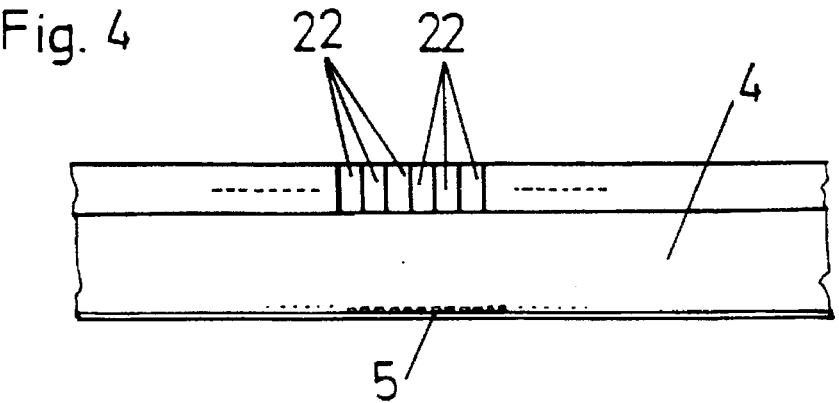
FIG. 4 shows a plan view of a cut-out section of the bar of a device according to the invention.

With the embodiment shown, the device according to the invention comprises a bar 4 with a plurality of juxtaposed picture sensors 5 which are distributed substantially over the entire longitudinal extent of the bar (cf. also FIG. 4). The bar 4 is guided by a guide element (vertical guide rod 6), wherein a carriage which is fixedly connected to the bar 4 slides on the guide 6. The picture sensors 5 can. For example, be formed by a line of a plurality of juxtaposed CCD-picture sensors, as known in Fax technology.

Figure 2:
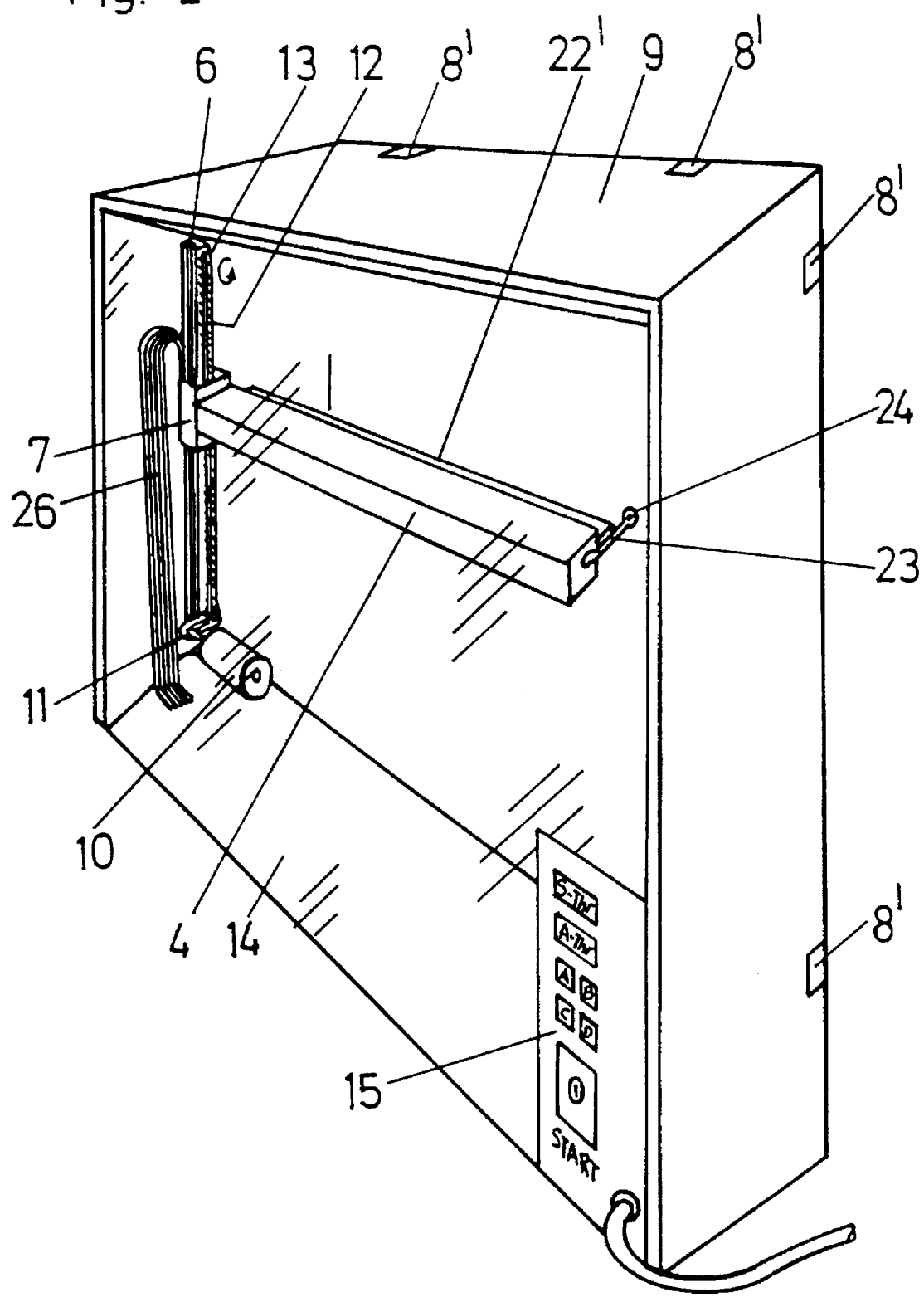
FIG. 2 shows an illustration in perspective of an embodiment of the device according to the invention.

The guide element 6 for the bar 4 is fixed to the screen 3, according to the invention, by securing means. These securing means can, for example, be in the form of screws 8 which firmly screw the guide rod 6 to the microfilm-reading device and thus firmly to the screen 4. If, as shown in FIGS. 1 and 2, a surrounding frame is provided, then the guide rod 6 can also be fixed to the screen 3 by way of this frame 9, wherein The frame 9, as shown in FIG. 2, has securing means 8' (such as screws, clamps, adhesive surfaces, or the like) and the guide rod 6 is easily and firmly connected to the frame 9. A frame 9 of this kind can also carry the drive motor 10 for the bar. With the embodiments shown in FIGS. 1 and 2, a pinion 11 of the motor drives a toothed belt 12 which is guided at the top over a direction-changing roller 13 and which is connected to the carriage 7. This toothed belt drive moves the bar quickly, accurately and uniformly over the entire surface of the screen. Clearly, other drives are quite conceivable and possible, such as toothed rods or conical spindles. In addition, the frame 9 can act as a means of protection, by covering over the moving parts of the device according to the invention at the side and by carrying a cover plate 14 at the front (FIG. 2). A keyboard 15, or other switch elements, can also be provided on this cover plate 14 for operating elements of the device according to the invention. It is also possible for a control device 16 for the drive motor 10 and/or an evaluation device for the electric picture signals to be provided within the frame 9. The control device and the evaluation device can, of course, also be arranged outside the frame, at an appropriate place.

Figure 3:
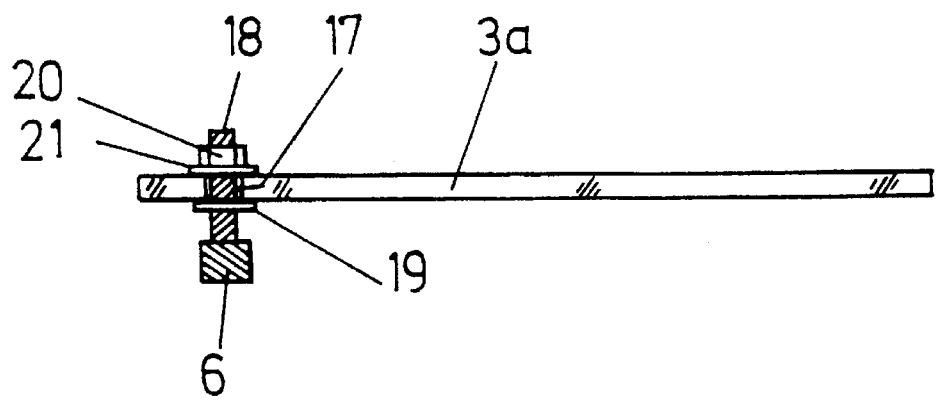
FIG. 3 is a horizontal section through the viewing screen of the screen showing the securing means and guide elements of an embodiment of the device according to the invention.

FIG. 3 shows another possible way of securing the guide rod 6. With most devices it is possible to change over the viewing screen 3a of the screen and to replace it with a viewing screen with holes 17. These holes 17 can act as securing means for fixing the guide element 6. With the embodiment shown in FIG. 3, a screwthreaded shaft 18 is fixed to the guide rod 6, and this shaft bears a flange 19. A nut 20 and a supporting disc 21 can be used as a simple way of securing the position of the screwthreaded shaft 18 and thus of the guide rod 6 relative to the viewing screen 3a of the screen. To subsequently fit out an existing device, the viewing screen simply has to be exchanged for the viewing screen shown in FIG.3a.

In order to map the picture displayed on the screen onto the picture sensors 5 which are in juxtaposed relationship in a line, a plurality of juxtaposed lenses (FIG. 4, FIG. 5) can be arranged upstream. Potential gradient index lenses are particularly favourable which produce a proper picture on a 1:1 scale. Despite the fact that there are fewer of these lenses than picture sensors, it is still possible to produce an integral picture by way of the picture sensors 5. As shown in FIG. 2, the lenses 22 can be joined to form one lens bar 22'.

During operation, the bar 4 is movable vertically to its longitudinal extent by the electric drive 10. In order to obtain as complete a picture acquisition as possible, it is favourable if the bar or the picture sensors arranged in it is/are movable over at least 80%, preferably over 100%, of the extent of the surface or screen, in the direction of movement of the bar, and if the picture sensors arranged in the bar scan at least 80%, preferably 100%, of the extent of the surface or screen disposed in the longitudinal extent of the bar.

In order to have a properly defined spacing from the screen, despite the bar 4 being guided on one side as shown in FIGS. 1 and 2, a roller 24 is fixed to a spacer element 23, and this roller rolls down the screen 3 or a separate rail, not shown.

The device according to the invention can, of course, also be secured in other directions relative to the screen, possibly being rotated though 90°, for example, and the beam can travel from left to right instead of from top to bottom.

Figure 5:
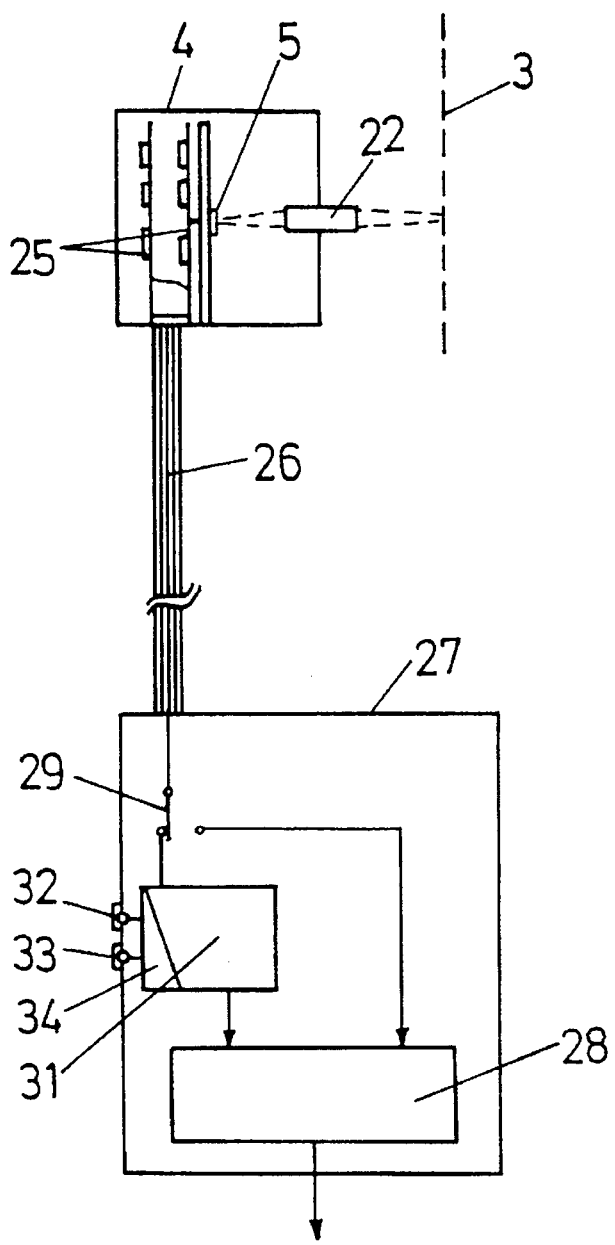
FIG. 5 shows an illustration of the electronic processing of the electric picture signals.

The picture data received by the picture sensors 5 during travel of the bar 4 in the embodiment shown in FIG. 5 is converted into binary coded picture halftone signals by an electronic switch 25 arranged in the bar 4, which are transmitted in bit parallel manner by way of a bundle of leads, preferably a flat twin lead 26 (not shown in FIG. 1 for the sake of clarity) to a stationary processing device 27 (FIG. 5). With eight bits it is possible to transmit 256 picture halftones, for example. In the simplest case, this data can be sent, without the intermediate memory, direct to a personal computer or a printer. The processing device can, however, also have a memory 28 for the picture halftone representation, which makes picture data available for further processing by way of a plug connection or an interface. With the embodiment shown in FIG. 5, it is possible to store a picture halftone representation directly in the memory 28 by way of the change-over switch 29 and leads 30.

On the other hand, however, it is also possible, according to the circuitry shown in FIG. 5, to supply the electric picture signals first of all to a digitalisation step 31, wherein, with the embodiment shown in FIG. 5, it has a device 34 which can be operated manually by key switches 32 and 33 for adjusting the digitalisation threshold. The digitalisation threshold establishes from which picture halftone stage it is possible to code halftone representations disposed above the digitalisation threshold with logic "1" and those below it with logic "0", for example. The black-white picture resulting from the digitalisation step 31 can likewise be stored in the memory 28, wherein to store black-white pictures, a smaller memory capacity is, of course, required in comparison with that for storing picture halftone representations. However, it is also possible to digitalise the picture online to give a black-white picture, and for print-out or out-put to take place without any intermediate memory.

Figure 5A:
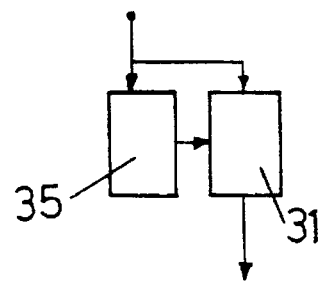
FIG. 5a shows an alternative to FIG. 5. Finally.

Instead of the manually adjustable adjustment device, shown in FIG. 5, for the digitalisation threshold, it is also possible, as shown in FIG. 5a, for an automatic adjustment device to be provided for adjusting the digitalisation threshold for the picture as a whole or for specific picture sectors. This automatic adjustment device 35 can function in various ways. For example, it is possible for the automatic adjustment device for compensating for non-uniform brightness on the screen to receive a picture of the empty luminous screen without microfilm or microfiche at predetermined time intervals or at the start of an operation, and to store the distribution of brightness in the adjustment device.

However, it is also possible to provide a buffer store in which the electric picture halftone signals of the picture points in the surrounding area of the momentarily processed picture point are read, and to provide an evaluation switch for the purpose of using the picture halftones, stored in the buffer memory, of the surrounding picture points to calculate the digitalisation threshold for the momentarily processed picture point. Calculation in this way of the digitalisation threshold is also known as adaptive calculation of threshold.

Generally, it is favourable if the bar moves back to its original position after the scanning process. This can be used to advantage during travel to read in picture signals in the device which are then used to make an automatic calculation of the digitalisation threshold, and the picture is only actually read in during return travel of the bar.

Clearly, the invention is not limited to the embodiments shown. The guide elements and securing means can be designed in accordance with structural conditions imposed by the microfilm- or microfiche reading device to be fitted out. In addition, guide elements are possible on either side for the bar 4. In addition, the frame 9 in FIGS. 1 and 2 can be omitted. The securing means and/or the guide element(s) can then be secured directly to the viewing screen (e.g. according to FIG. 3). The device according to the invention can also be used to scan other luminous surfaces, apart from screens of microfilm- or microfiche-reading devices.

Figure 6:
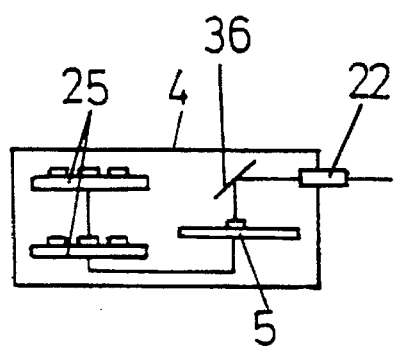
FIG. 6 shows an alternative design of the bar.

The device according to the invention is particularly suitable for fitting out existing devices. It is, however, quite conceivable and possible to install the device according to the invention on a device from the outset. The invention also encompasses microfilm- or microfiche-reading devices with a screen and a device for converting the picture displayed on the screen into electric signals, wherein a bar with a plurality of picture sensors in juxtaposed relationship in a line is mounted to the reading device, or at least one guide element fixedly connected thereto, so that it is able to move over the front of the screen facing the observer. Contrary to devices integrated in large devices for converting the picture into electric signals, the device according to the invention, apart from being advantageous in terms of its cost, is also advantageous in that most of the picture remains visible during reading in of the picture. Only the region covered over momentarily by the bar is unable to be seen. The structural height of the bar 4 can also be further reduced, if, as shown in FIG. 6, a deflecting mirror 36 is used.

What is claimed is:

1. A device for converting the picture displayed on a screen into electric signals, characterized in that the device comprises a bar (4) with a plurality of picture sensors (5); at least one guide element, the bar being movably guided by the at least one guide element; means (8,8',18–21) for securing the at least one guide element (6) in a specific position relative to the screen (3) said means making direct contact with a glass of said screen; and wherein the securing means (8,8',18–21) and each of the at least one guide elements (6) being designed in such a way that, with a device which is mounted to the screen (3), the bar (4) travels close in front of a front side of the screen which faces the observer.

2. A device according to claim 1, characterized in that arranged on the bar is at least one roller-or slide element (24) which rolls or slides down the screen when the device is assembled.

3. A microfilm- or microfiche-reading device (1) with a screen (3) and a device for converting the picture displayed on the screen into electrical signals comprising a bar (4) with a plurality of picture sensors, which are disposed in juxtaposed relationship in substantially linear form, and being movably mounted to the reading device (1) at least one guide element (6) fixedly connected to a glass of said screen, over the front side of the screen (3) facing the observer.

4. A device for converting the picture displayed on a luminous surface or screen into electric signals, the device comprising:

a bar (4) with a plurality of picture sensors (5);

at least one guide element, the bar being movably guided by the at least one guide element;

means (8,8',18–21) for securing the at least one guide element (6) in a specific position relative to the luminous surface (3); and an electronic converter (25), which reads off in sequential manner the picture data present in the picture sensors (5) and converts it into binary coded picture halftone signals.

5. A device according to claim 4, characterized in that the electronic converter (25) is arranged in the bar (4).

6. A device according to claim 4, characterized in that a bundle of leads (26) passes from the electronic converter to a stationary processing device (27).

7. A device according to claim 4, characterized in that coming from the electronic converter (25) is a flat twin lead (26) on which the binary coded picture halftone signals are transmitted in bit parallel manner.

8. A device according to claim 4, characterized in that the picture halftone signals supplied from the electronic converter (25), arranged downstream of the picture sensors (5) are digitalised in a digitalisation step (31).

9. A device according to claim 8, characterised by an adjustment device (34) which can be manually operated for adjusting the digitalisation threshold for the picture as a whole or for specific picture sectors.

10. A device according to claim 8, characterised by an automatic adjustment device (35) for adjusting the digitalisation threshold for the picture as a whole or for specific picture sectors.

11. A device according to claim 10, characterized in that the automatic adjustment device (35) compensates for non-uniform brightness on the screen (3) and receives a picture of the empty luminous screen without microfilm or microfiche at predetermined time intervals or at the start of an operation and stores the distribution of brightness in the adjustment device (35).

12. A device according to claim 10, characterised in that a buffer store is provided, in which the electric picture halftone signals of the picture points in the surrounding area of the momentarily processed picture point are read in, and that an evaluation switch is also provided for the purpose of calculating the digitalisation threshold for the momentarily processed picture point on the basis of the picture points surrounding the picture halftones stored in the buffer store.

13. A device according to claims 10, characterized in that the signals, being read in when the bar (4) travels from an initial position in a first direction, are supplied to the automatic adjustment device (35) for calculating the digitalisation threshold, and the signals input when the bar (4) travels back to the initial position are digitalised in the digitalisation step (31) with the digitalisation threshold calculated by the adjustment device (35).

14. A device for converting the picture displayed on a luminous surface or screen into electric signals, the device comprising:

a bar (4) with a plurality of picture sensors (5);

at least one guide element, the bar being movably guided by the at least one guide element;

means (8,8',18–21) for securing the at least one guide element (6) in a specific position relative to the luminous surface (3); and a line of juxtaposed lenses (22) being arranged upstream of the picture sensors (35) arranged in a line.

15. A device according to claim 14, characterised in that the lenses (22) are preferably cylindrical potential gradient index lenses which produce a correct picture on a 1:1 scale.

16. A device according to claim 14, characterised in that there are fewer lenses (22) than picture sensors (5).

17. A device for converting the picture displayed on a luminous surface or screen into electric signals, the device comprising:

a bar (4) with a plurality of picture sensors (5);

at least one guide element, the bar being movably guided by the at least one guide element;

means (8,8',18–21) for securing the at least one guide element (6) in a specific position relative to the luminous surface (3); and a transparent cover plate (14) being disposed in front of the side of the bar (4) facing the observer.

18. A device according to claim 17, characterised in that the cover plate (14) is held in a frame which surrounds the outside of the bar together with the drive (10–13) and guide element.

19. A device for converting the picture displayed on a luminous surface or screen into electric signals, characterized in that the device comprises a bar (4) with a plurality of picture sensors (5); at least one guide element, the bar being movably guided by the at least one guide element; means (8,8',18–21) for securing the at least one guide element (6) in a specific position relative to the luminous surface (3); and wherein the securing means (8,8',18–21) and each of the at least one guide elements (6) being designed in such a way that, with a device which is mounted to the surface or screen (3), the bar (4) travels close in front of a front side of the luminous surface or screen which faces the observer, wherein arranged in or on the bar is a deflecting mirror for the purpose of deflecting the light which comes from the surface onto the picture sensors.

20. A device for converting the picture displayed on a luminous surface or screen into electric signals, characterized in that the device comprises a bar (4) with a plurality of picture sensors (5); at least one guide element, the bar being movably guided by the at least one guide element; means (8,8',18–21) for securing the at least one guide element (6) in a specific position relative to the luminous surface (3); and wherein the securing means (8,8',18–21) and each of the at least one guide elements (6) being designed in such a way that, with a device which is mounted to the surface or screen (3), the bar (4) travels close in front of a front side of the luminous surface or screen which faces the observer, wherein the luminous surface includes a viewing screen having at least one aperture therethrough and the securing means is secured to the viewing screen by means of the at least one aperture.

* * * * *